United States Patent [19]

Grinstead

[11] 4,451,375

[45] May 29, 1984

[54] IODINE ADSORPTION VIA PICOLYLAMINE ION EXCHANGE RESINS

[75] Inventor: Robert R. Grinstead, Walnut Creek, Calif.

[73] Assignee: The Dow Chemical Company, Midland, Mich.

[21] Appl. No.: 526,303

[22] Filed: Aug. 25, 1983

[51] Int. Cl.$^3$ .............................................. B01J 41/04
[52] U.S. Cl. .................................... 210/670; 210/683; 423/501
[58] Field of Search ................ 210/670, 683; 423/501; 521/32, 36

[56] References Cited

U.S. PATENT DOCUMENTS

| | | |
|---|---|---|
| 2,157,508 | 5/1939 | Urbain et al. ........................ 210/683 |
| 2,945,746 | 7/1960 | Shaw ................................... 210/683 |
| 3,352,641 | 11/1967 | Nakamura et al. ................. 423/501 |
| 4,031,038 | 6/1977 | Grinstead et al. ..................... 521/32 |
| 4,098,867 | 7/1978 | Grinstead et al. ..................... 521/32 |
| 4,131,645 | 12/1978 | Keblys et al. ....................... 423/501 |

FOREIGN PATENT DOCUMENTS

| | | | |
|---|---|---|---|
| 1401113 | 4/1965 | France .............................. 423/501 |
| 339130 | 5/1975 | U.S.S.R. ............................ 423/501 |

*Primary Examiner*—Ivars C. Cintins

[57] ABSTRACT

Resins bearing picolylamine moieties selectively adsorb iodide ions from acidic aqueous solutions. The iodide can be readily eluted from the resin with base. Particularly useful resins are obtained by reacting chloromethylated styrene-divinylbenzene copolymers with N-(2-hydroxyethyl)-2-picolylamine or bis-(2-picolyl)amine.

4 Claims, No Drawings

IODINE ADSORPTION VIA PICOLYLAMINE ION EXCHANGE RESINS

BACKGROUND OF THE INVENTION

This invention relates to a method of extracting iodide ions from an aqueous medium. In particular, this method employs polymers bearing a plurality of picolylamine moieties to selectively extract iodide ions from an acidic aqueous medium.

Iodine recovery from brine has been classically effected by oxidation of iodide present in acidified brine to the elemental state. The iodine can then be "blown out" of the brine with air and recovered. Chlorine is frequently used in excess as the oxidizing agent. The use of large quantities of acid and chlorine is a disadvantage of this method.

Iodide ions can also be extracted from an aqueous medium using conventional ion exchange resins. However, the relatively low iodide/chloride exchange constant of conventional weak base ion exchange resins is not favorable. Strong base resins exhibit a higher iodide/chloride exchange constant, but cannot be as readily regenerated.

SUMMARY OF THE INVENTION

It has now been found that iodide ions can be extracted from an acidic aqueous medium with a polymer bearing a plurality of moieties containing at least one picolylamine group. This polymer is then separated from the aqueous medium. The iodide can be readily eluted by contacting the polymer with base.

Especially surprising is the selectivity the subject picolylamine polymers exhibit for iodide relative to chloride ions. Typically, $K_{Cl}^{I}$, that is the equilibrium constant for the reaction $I^{\ominus} + Cl^{\ominus}$ resin $\rightleftharpoons I^{\ominus}$ resin $+ Cl^{\ominus}$, is at least 10.

DETAILED DESCRIPTION OF THE INVENTION

Polymers containing picolylamine moieties are well known in the prior art. Such polymers were described in U.S. Pat. Nos. 4,031,038 and 4,098,867, which are incorporated herein by reference.

Especially preferred are polymers containing a plurality of one of the following two picolylamine moieties:

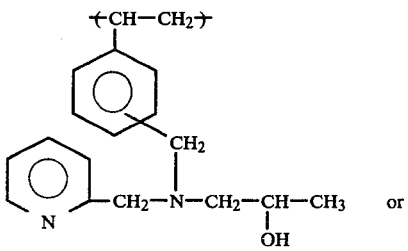

or

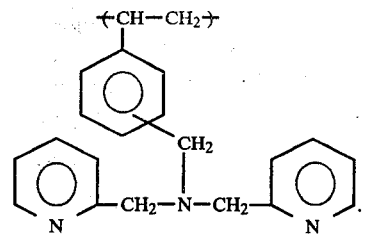

The 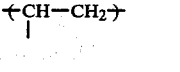 group in each formula is part of the polymer backbone. Preferably, the polymer backbone is derived from a chloromethylated styrene-divinylbenzene resin. Such polymers are available commercially from The Dow Chemical Company under the designations XFS-43084 and XFS-4195, respectively. The bis(2-picolylamine) resin is especially preferred.

The subject picolylamine resins may contain a limited number of quaternary ammonium moieties, which are strong base anion exchangers. These strong base exchanger moieties will adsorb iodide anions, but cannot be readily regenerated using caustic. Consequently, it is desirable to eliminate strong base anion exchanger moieties from the resin in so far as possible. Generally, treatment of the resin in 1 normal NaOH for several hours at elevated temperatures will significantly reduce the occurrence of these moieties in commercial resins. However, in some instances such treatment may deleteriously affect porosity or other resin properties.

The aqueous medium must be sufficiently acidic so that the picolylamine resin is present predominantly in its protonated form. The pH of the medium should be less than about 7, preferably less than about 5, more preferably a pH in the range from about 2 to about 3. The resin designated XFS 43084 is operable at somewhat higher pH values than the XFS 4195 resin. While the capacity of the resins typically decreases with increasing pH, the selectivity of the resin for iodide relative to chloride ions generally increases. The XFS 4195 resin is especially selective, but the XFS 43084 resin has greater exchange capacity.

The duration and conditions of contact are generally not critical other than the polymer should contact the liquid acidic aqueous medium for sufficient time to promote significant anion exchange. Advantageously, the aqueous medium is allowed to percolate through a column or bed of the polymer. Temperatures in the range from about 10° to about 30° C. are preferred for this contact.

When analysis of portions of liquid treated with the polymer indicates that removal of iodide has diminished, the iodide capacity of the resin can be readily regenerated. The polymer is simply contacted with an aqueous base which will deprotonate the picolylamine moieties. The iodide is recovered in the eluate from the base treatment. Accordingly, a concentrated solution of base is desirably used to increase the concentration of iodide. Preferred bases include KOH and NH4OH, most preferably NaOH.

Iodine can be recovered from the concentrated solution obtained by the subject method using conventional techniques. The increased concentration of iodide ions results in a significant savings of chlorine and acid in the conventional oxidation procedure.

The following examples are presented to illustrate the invention. All parts and percentages in the Examples are by weight unless otherwise indicated.

EXAMPLE 1

A 0.5 molar aqueous NaCl solution containing 70 milligrams per liter (mpl) iodide was adjusted to a pH of 2.0 with HCl. Approximately 2000 milliliters (ml) of the NaCl solution was passed through a 20 ml column (1.13 cm$^3$ cross-section, 15 cm height) packed with XFS 4195 ion exchange resin. The flow rate was 5 ml per minute.

Periodically samples of the eluate were analyzed for iodine, so that the amount of iodide adsorbed by the resin could be determined. This analysis was performed by adding 4 ml of a 2 molar acetate buffer (1.5 molar NaO$_2$CCH$_3$, 0.5 M HO$_2$CCH$_3$) and 10 drops water saturated with bromine to a 20 ml sample. The sample was allowed to stand for 4 minutes and then 1 gram of sodium formate was added. Air was blown over the resulting solution to remove any bromine vapor present. After 10 minutes, 1 ml concentrated H$_3$PO$_4$ and 0.5 gram KI was introduced. The solution was then titrated with 0.02 normal sodium thiosulfate using a starch endpoint. Iodide concentration was determined from the following relationship:

$$424 \times \left( \frac{\text{titration volume}}{\text{sample volume}} \right) = \text{ppm Iodide.}$$

It was determined that the resin adsorbed about 100 milligrams iodide. The resin was then regenerated with 1 molar NaOH introduced at a flow rate of 5 ml per minute. Regeneration required about 200 ml of the NaOH solution. The eluate contained about 350 milligrams iodide per liter (mg I/l), a five-fold increase in concentration.

EXAMPLES 2–6

Small quantities of XFS 4195 and XFS 43084 resins were contacted batchwise with 0.5 molar aqueous solutions containing 66 milligrams iodide per liter. The solutions differed in their pH between examples. The iodide present in the solution and on the resin was determined, as was the equilibrium constant $K_{Cl}^I$. The pH and results for each example are tabulated in Table I.

TABLE I

| Example | Resin | pH | I$^\ominus$ Sol'n (mg I/l) | I$^\ominus$ Resin (mg I/l) | $K_{Cl}^I$ |
|---|---|---|---|---|---|
| 2 | XFS 4195 | 4.9* | 45 | 2000 | 111 |
| 3 | " | 5.6* | 45 | 2000 | 148 |
| 4 | " | 6.5** | 47 | 1800 | 193 |
| 5 | XFS 43084 | 5.9* | 50 | 1600 | 67 |
| 6 | " | 6.7** | 56 | 1100 | 62 |

*0.05 molar acetate buffer.
**0.05 molar phosphate buffer.

What is claimed is:

1. A method of extracting iodide ions from an aqueous medium comprising:
   (a) contacting an acidic aqueous medium containing iodide ions with a polymer bearing a plurality of moieties each containing at least one picolylamine group;
   (b) separating the polymer from the aqueous medium; and
   (c) contacting the polymer with a base so as to elute iodide adsorbed by the polymer.

2. The method as described in claim 1 wherein the aqueous medium to be extracted also contains chloride ions and $K_{Cl}^I$ is at least 10.

3. The method as described in claim 2 wherein the polymer contains picolylamine moieties corresponding to the formula

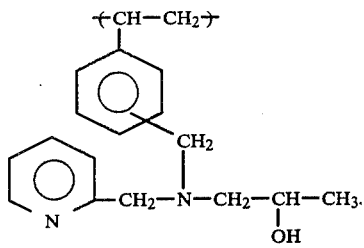

4. The method as described in claim 2 wherein the polymer contains picolylamine moieties corresponding to the formula

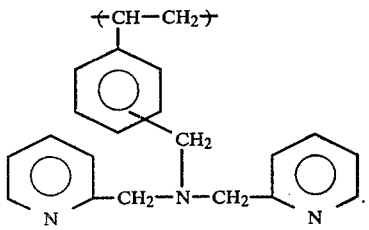

* * * * *